Sept. 12, 1944.  W. F. BIRD  2,358,204

METHOD OF MAKING PILE FABRICS

Filed Feb. 27, 1943

INVENTOR.
Whitworth F. Bird.
BY Darby & Darby
Att'ys.

Patented Sept. 12, 1944

2,358,204

UNITED STATES PATENT OFFICE 2,358,204

METHOD OF MAKING PILE FABRICS

Whitworth Fontaine Bird, Swarthmore, Pa., assignor to Collins & Aikman Corporation, Philadelphia, Pa., a corporation of Delaware Application February 27, 1943, Serial No. 477,362

2 Claims. (Cl. 117—33)

This application is a continuation in part of my copending application Serial No. 348,501, filed July 30, 1940, for Laminated textile faced article and method of making the same.

This invention relates to a floor covering or the like and of its method of manufacture. More particularly, the invention is directed to the provision of a floor covering comprising layers or laminae intimately joined together during fabrication and having an exceedingly smooth and uniform textile face side. The textile face may be applied in the form of flock to form a suede finish or if, as is preferred, the flock particles are cut flock having length dimensions of the nature of $\frac{1}{32}$ inch upward to $\frac{1}{2}$ inch or longer, a pile surface can be produced by vibrating the base and/or by the use of electrostatic devices, as is understood in the flocking art.

It is of particular importance in the production of suede and fine short pile effects that the flocked particles, which may be of hair, rayon, wool, mohair, cotton and the like, be attached to a smooth and uniform base, as any irregularity will show on the finished face and/or provide poor anchorage at the locality of the irregularity.

These objectionable irregularities are liable to occur in prior practices, and particularly in those cases in which the base material is subjected to rigorous treatment during fabrication, as in the production of a base comprising sponge rubber formed from blowing stock calendered on to a relatively open weave reenforcing fabric such as burlap.

My improvements eliminate these prior art difficulties and I am enabled to simultaneously heat treat or vulcanize different constituent portions of articles having a finished suede face of ground flock or a pile face of longer flock. I do this, according to a preferred practice of my invention, by applying a sealing ply of adhesive as by calender rolls (or by spreading) to one side of the reenforcing material so as to seal the interstices or openings in the burlap and/or to force at least a small portion of the sealing coat to the opposite side from which it is applied. The extent to which the sealing ply is forced through the fabric can be varied to in turn vary the exposure of the fabric threads for a purpose to be explained.

Immediately following the application of the sealing ply and as part of a continuous operation of manufacture, I calender to the opposite side a ply of unvulcanized rubber blowing stock. The calender rolls which apply the blowing stock reenforce the sealing stock during such application, cause adhesion of the blowing stock to the reenforcing fabric and result in an intimate mixing of the blowing and the non-blowing stock at numerous points without breaking the seal of the non-blowing stock.

The composition of the blowing stock need not be compatible with the sealing ply, although it may be. Where it is compatible with the sealing ply it will, of course, adhere to the exposed portions thereof, as well as to the exposed thread areas. In cases where the blowing stock is capable of adhering to the exposed portions of the sealing ply better than to the exposed areas of the threads it follows that a more strongly laminated product will result if the sealing ply is forced through the interstices of the fabric to a greater extent so as to increase the area thereof exposed to contact with the blowing stock. On the other hand, when the blowing stock is not compatible with the sealing ply in that it does not adhere strongly thereto, the sealing ply had best be forced through the interstices of the fabric to a lesser extent so as to increase the area of the exposed threads, and therefore the area of the surfaces of adherence between the threads and the blowing stock. Thus by judicious variation of these conditions it is possible to insure strong adherence between the structure elements by taking into account the differences in compatible or adhering characteristics between the sealing ply, the fabric threads and the blowing stock.

As a result of these two calendering operations, the non-blowing stock surface is rendered exceedingly smooth and uniform, and the three-ply material thus formed is sufficiently coherent to successfully withstand vibration for the flocking operation.

Subsequent to the two calendering steps, I apply a third coat of anchoring adhesive to the smooth surface provided by the non-blowing rubber stock, and to this surface sprinkle or otherwise apply the suede or pile forming textile face surface in a known and convenient manner. The vulcanization may then be carried out in the usual controlled manner to cause blowing of the rubber stock to form sponge rubber and the simultaneous vulcanization of the three applied coats.

It will thus be seen that I have eliminated any irregularities caused from the blowing stock working through to the face side of the reenforcing burlap, and have effectively prevented any blowing from taking place on said side. It is, of course, clear that the ends of the pile forming flock particles must be firmly embedded in their anchoring medium, and it will be seen that by the elimination of irregularities a smooth surface is provided for the application of a relatively thin coat of pile securing material. As above stated, this is especially important in connection with the manufacture of a fine short pile face flocked material. It is also highly advantageous in connection with the longer pile, as an adhesive coat would tend to seek its level and be absent or exceedingly thin over any irregularity which might be formed from blowing of rubber stock on the face side of the reenforcing fabric.

In addition to eliminating the defects resulting from the presence of blowing stock on the face side of the reenforcing burlap or other fabric, my improvement contemplates that each of the pile forming flock particles will be held entirely by non-blowing stock to insure uniformity of anchorage and that each particle be firmly held by non-porous and non-blown stock. It is to be understood that the sealing ply is non-porous and that the escape of gases during blowing is entirely from the back or reverse side of the material.

It is further to be understood that while I prefer to limit the position of the blowing stock to the base side of the reenforcing fabric, that the invention in its broader aspect is not so limited and contemplates an adhesive ply which serves as a smooth uniform surface, free from irregularities for the flock material and which becomes, either alone or with the reenforcing material, a seal for the blowing stock and effectively prevents irregularities which would result from blowing taking place on or through the flock supporting surface.

The procedure including the order of steps may be altered, but in all cases, including the use of a heavy sealing ply and a lighter blowing ply, I provide a smooth, unbroken surface for a coat of anchoring adhesive, which alone or together with the sealing ply securely anchors the ends of the pile forming particles.

The calendered sealing ply and blowing stock ply are preferably of substantially like constituents, with the exception of the gas forming chemicals of the blowing stock. As previously explained, it is not necessary in order to gain the advantages of this invention that the sealing ply and blowing stock be of substantially like constituents although good commercial practice makes this condition preferable. The anchoring adhesive coat is preferably a rubber solution applied by spreading, which fact aids in its merger with the sealing ply and permits, through the softening action of the solvent, the sealing ply to function as a portion of the anchoring medium. The softening action of the top coat does not, however, destroy the sealing function. I further contemplate the application of a non-adhesive solvent to the calendered sealing ply, so that the sealing ply may constitute the complete anchoring medium for the textile face. In this case the solvent rubber coat may be dispensed with.

An object of this invention is to provide a calendered sealing ply of non-porous rubber and rubber compounding constituents and a reenforcing fabric therefor which, together or in conjunction with additional materials, serve as a base for a textile face.

Another object is to provide an intermediate product having a sealing ply, a reenforcing fabric and a sponge rubber case, wherein all the sponge rubber is restricted to the base side of the reenforcing fabric. Both natural rubber either crude or reclaimed and synthetic rubber and other rubber-like materials and mixtures of all of these ingredients may be employed as an ingredient of the blowing stock.

Another object is to provide a flocked pile fabric having a base of sponge rubber and a securing means for the flock which aids in preventing the sponge rubber from becoming an anchoring medium for the pile.

Another object is to provide a covering including a sponge rubber base formed from blowing stock and a sealing ply, wherein the sealing ply and blowing stock are intimately merged on the base side of a reenforcing fabric.

Another object is to provide a continuous or other method of manufacture of a flocked material and the simultaneous treatment of a base ply, sealing ply and an adhesive.

These and other objects of invention will be manifest from a consideration of the following description, claims and illustrated embodiment, in which—

Figure 1:
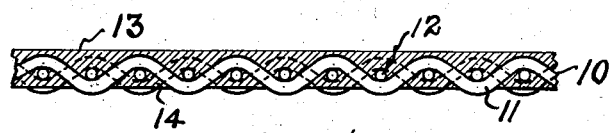
Figure 1 is a view of a reenforcing fabric having a smooth sealing ply or coat on one side, which fills the interstices of the reenforcing fabric.
Figure 2:
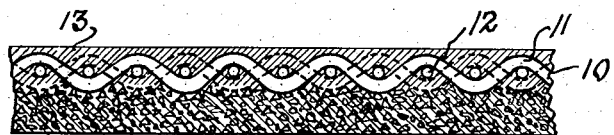
Figure 2 is similar to Figure 1, with the addition of sponge rubber on the reverse side of the reenforcing fabric.
Figure 3:
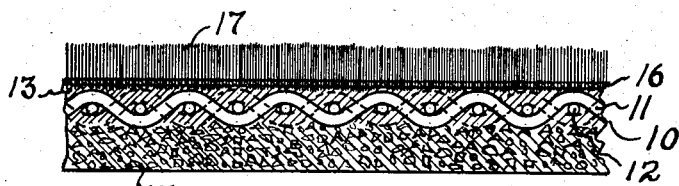
Figure 3 is a complete assembly view of the flock, anchoring coat, sealing ply, reenforcing fabric and sponge rubber base.

Referring to the drawing, and specifically to Figure 1, I have illustrated a reenforcing fabric 10 which is comprised of warp threads 11 and weft threads 12. This reenforcing fabric preferably is of an open weave such as burlap. It is to be understood, however, that certain advantages of the invention may be derived with the use of more closely woven or fabricated reenforcing fabrics, such as duck, canvas and light weight materials. The use of a relatively open weave structure aids in the final integration of the finished product and is preferable for reasons of economy.

Superposed on the reenforcing fabric is a sealing ply 13, which may be applied by calendering, so as to force a portion of the ply through the interstices of the reenforcing fabric 10, in order that small portions 14 appear on the reverse side of the fabric. As previously explained, the sealing ply may be forced through the openings in the fabric to a variable amount depending upon whether the material and the sealing ply is or is not compatible with the sponge rubber base. As is clear from Figure 1, by such a variation the areas of the portions 14 can be made smaller or greater and the areas of the exposed threads 11 at the back can likewise be varied inversely.

Following the application of the sealing ply, which is a relatively heavy and non-porous composition of rubber, compounding agents such as vulcanizers, and if desired filling materials, I apply to the opposite side of the reenforcing fabric a ply of blowing sponge rubber stock 15 by the use of calender rolls. As the fabric 10 and the sealing ply 13 pass through the calender rolls which attach the blowing stock ply, the calender rolls reenforce the sealing ply and effectively prevent any of the blowing stock 15 from passing through the interstices of the reenforcing fabric up on to its face side. This intermediate product may then be vulcanized and stored for ultimate use as a base for textile faced finished articles. I prefer, however, to apply a third adhesive coat 16 prior to vulcanization and to immediately thereafter sprinkle, or otherwise apply, pile forming flock particles 17 to said third coat and simultaneously heat treat or vulcanize all of the coats or plies as a final step after the flock particles have been secured at one end to produce the pile effect.

The basic ingredient of the blowing stock from which the spongelike backing is made may comprise naturally occurring rubbers from various botanical sources such as by way of example "*Hevea brasiliensis*," various types of dandelion, "Guayule," milk weed and the like. It may also be composed of various synthetic rubbers such as "Buna N," a condensation product of acrylonitrile and butadiene, examples of which are known in the trade as "Perbunan," "Hycar," "Chemigum" and "Butaprene"; "Buna S," the condensation product of polystyrene and butadiene; "neoprene," the polymers of 2-chloro buta-diene; "Thiokol," the condensation product of ethylene-dichloride and sodium polysulphide; and butyl rubber, comprising copolymers of isobutene and butadiene. It is, of course, apparent that reclaimed rubbers of all kinds as well as mixtures of natural, synthetic and/or reclaimed rubbers may be used.

The composition of the sealing ply may vary between relative wide limits, depending on the base portion used, the type of fibers used in the face, the length of the flock fibers and the desired weight of the finished article. In general, when a base of blown sponge rubber is contemplated, I use a sealing ply composition having rubber constituents of vulcanizable qualities compatible with that of the blowing rubber stock and of the anchoring coat when that is a rubber compound.

The basic composition of the sealing ply may consist of the naturally occurring rubbers, synthetic rubbers, reclaimed rubber and/or suitable mixtures thereof. In addition it may be composed of elastomers such as "Vistanex," polystyrene, polyvinyl, butyral, "Vinylite" and polymerized acrylonitriles. It may be composed of plasticized cellulose derivatives such as nitrocellulose, ethyl-cellulose, cellulose acetate and other esters and ethers. It may also be composed of plasticized glues, gelatines, casein and similar protein derivatives, such as those obtained from soya beans; all of these materials subsequently can be made water insoluble, by treatment with vapors of formaldehyde, as is well known. The sealing ply can also be made of naturally occurring and synthetic resins such as pontianak, Manila, kauri, Congo, rosin, hydrogenated rosin, polymerized rosin, and the corresponding glycerol or glycol-esters, urea-formaldehydes, melamines and phenol-formaldehydes. Finally, suitable tars, pitches and asphalts may be used.

The adhesive coat 16 referred to above may be made of any adhesive capable of creating a good bond between the flock and the sealing ply. Ordinarily this is best achieved by using an adhesive which has essentially the same composition as the sealing ply. The two compositions need not be identical however as long as the bond between the sealing ply and the adhesive is commercially acceptable.

The sealing stock and anchoring coat will, of course, not contain the gas forming compounds of the blowing stock. The sealing ply, after its one or two calendering operations, is very even and serves as an excellent base for the finest textile face finish. This sealing ply may be softened by solvents, preferably those of the anchoring coat, and together with the anchoring coat will most firmly and uniformly hold the pile forming flock particles which are embedded therein. The anchoring coat may aid the sealing ply in preventing any blowing through or blowing on the face side of the reenforcing fabric.

The sealing and blowing rubber plies may, if desired, be sheeted prior to attachment to each other by calendering or to opposite sides of the reenforcing fabric. If the textile face be other than flock, as for example, a woven fabric, the textile face may constitute the reenforcement. I am, however, more concerned with flocked fabrics and prefer an independent reenforcing fabric within the base rather than on either its top or at the bottom of the sponge rubber.

As an example of the character of mixture for the sealing ply, an approximate formula is as follows:

| | Parts by weight |
|---|---|
| Rubber (new and reclaim) | 200 |
| Zinc oxide | 5 to 10 |
| Sulphur | 1 to 2.5 |
| Accelerator | 1 to 2 |
| Clay | 20 to 50 |
| Antioxidant | 1 to 2 |
| Whiting | 100 to 150 |
| Resin | 5 to 10 |
| Mineral oil | 5 to 10 |

The blowing coat will, in addition to the above, contain a gas forming constituent and the anchoring coat will preferably, although not necessarily, be a solvent rubber cement of the same base compound as the sealing and blowing stock, with the addition of the solvent.

When the reenforcing fabric is of a tight weave such as canvas, or if the base be other than blown sponge rubber, the calendered sealing ply will still provide a table top like surface for the smooth textile face and may, by the use of softeners, as stated above, aid the anchoring coat in securely embedding pile forming flock fibers. I may calender the sealing ply for the second time while adhesively applying a felt pad backing instead of the blowing stock. In this construction it is preferred to incorporate rubber on the back of the felt pad to impart anti-slip properties to the completed unit as well as to protect the unit against early disintegration.

As an aid in simplifying the claiming of the subject matter of this invention, it is to be understood that the use of the terms "sponge rubber" and "rubber" in the claims is for the purpose of including all of the naturally occurring and synthetic rubbers as well as reclaimed rubber and mixtures of two or more of them.

While I have described my improvements in relation to preferred embodiments, I do not intend to be limited except by the scope of the following claims.

What is claimed is:

1. In the manufacture of flocked fabrics, the steps which consist in providing a reenforcing fabric, calendering on a sealing ply to overlie one side and to fill the interstices of the reenforcing fabric by forcing a portion of the sealing ply therethrough, then calendering a ply of blowing stock on the reverse side of the reenforcing fabric, applying a thin anchoring coat to the sealing ply and sprinkling pile forming flock particles over the anchoring coat, rapidly vibrating the fabric to firmly secure the flock, and finally heat treating the entire article as a unit.

2. A method of manufacturing flocked fabrics comprising the steps of calendering a rubber sealing ply to one side of a reinforcing fabric to fill the interstices of the fabric by forcing a portion of the sealing ply therethrough, calendering a ply of rubber blowing stock on the other side of the reinforcing fabric, applying a thin adhesive anchoring coating to the sealing ply, applying flock fibers to the adhesive coating and heat treating the unit to simultaneously vulcanize the rubber plies and convert the blowing ply to sponge rubber.

WHITWORTH FONTAINE BIRD.